A. L. CHOPIN.
UNIVERSAL COAL CUTTING MACHINE.
APPLICATION FILED JULY 7, 1919.

1,384,236.

Patented July 12, 1921.
2 SHEETS—SHEET 1.

Inventor:
Alberic Louis Chopin,
By: B. Singer, Atty.

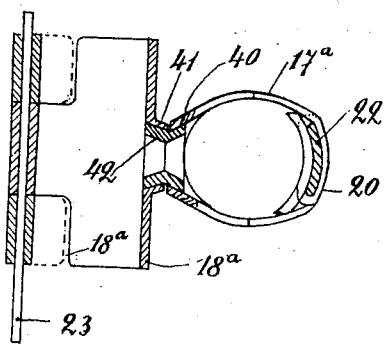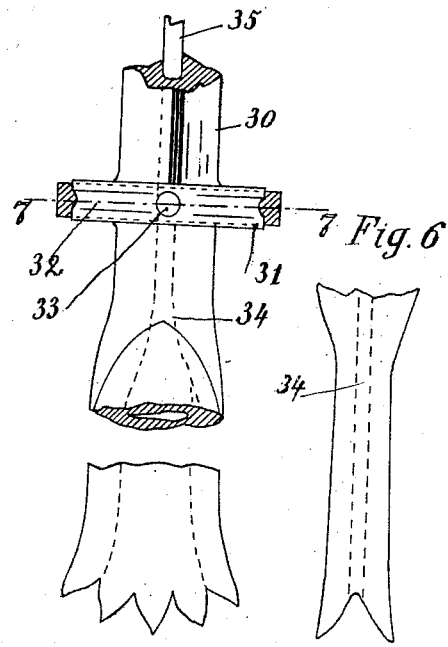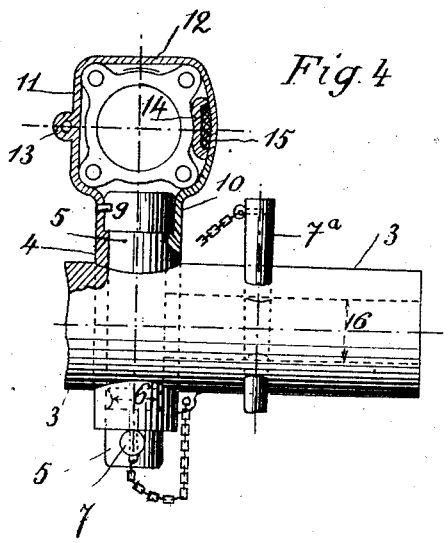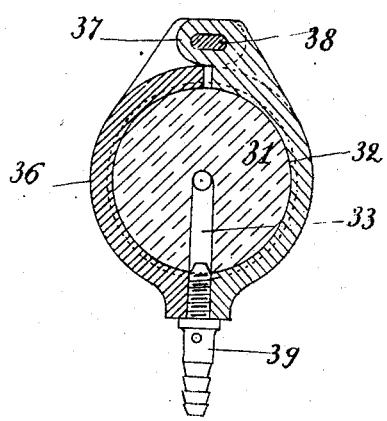

UNITED STATES PATENT OFFICE.

ALBÉRIC LOUIS CHOPIN, OF PARIS, FRANCE.

UNIVERSAL COAL-CUTTING MACHINE.

1,384,236.  Specification of Letters Patent.  Patented July 12, 1921.

Application filed July 7, 1919. Serial No. 309,127.

*To all whom it may concern:*

Be it known that I, ALBÉRIC LOUIS CHOPIN, residing at Paris, France, have invented new and useful Improvements in or Relating to Universal Coal-Cutting Machines, of which the following is a specification.

This invention relates to a universal coal cutting machine so arranged that it can work in any direction and in any position, and attack the cutting front at any desired point.

One of the characteristic features of this invention is the application to coal cutting of the compressed air hammer, but it is further characterized by other special arrangements which will be hereinafter described.

Figure 1:
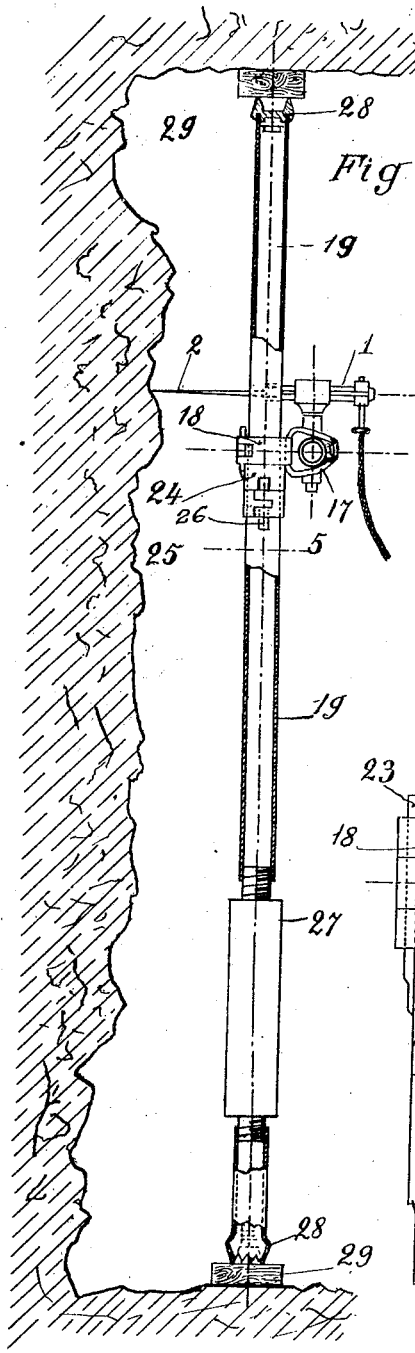
Figure 2:
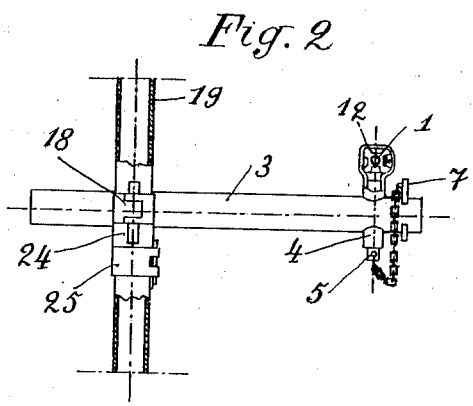
Figure 3:
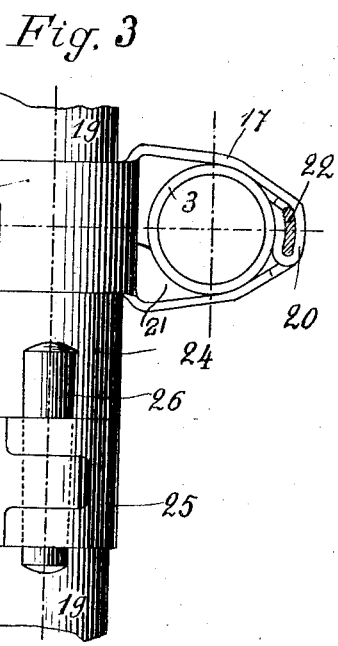

In the accompanying drawing given merely by way of example,

Figure 1 is a general arrangement, in elevation partly in section, of the universal coal cutting machine and of its installation in a mine gallery, Fig. 2 is a front elevation partly in section of the coal cutting machine in projection of Fig. 1, Figs. 3 and 4 are respectively an elevation and a side view partly in section, showing the mounting of the pneumatic hammer, Fig. 5 is a front elevation partly in section of a drill construction given by way of example, Fig. 6 is a side elevation of the same drill, Fig. 7 is a cross-section on line 7—7 of Fig. 5, and Fig. 8 is a section of a modified construction of one of the collars or clips of the system.

As already stated, the essential part of the coal cutting machine comprises a pneumatic hammer 1 which, instead of being provided with a tool for metal working, carries a drill 2 practically similar to that used in ordinary coal cutting machines, but preferably flattened.

The pneumatic hammer 1 is mounted on an arm 3 comprising a metal tube, near one of the ends of which is formed a branch 4 at a right angle to the axis of the said tube; into the said branch is introduced a cylindrical rod 5 provided near one of its ends with a circular groove 6 and with a diametrical hole intended to receive a pin or cotter 7 which keeps it on the branch 4. This pin 7 is preferably attached to the tube 3 by means of a chain 8 as shown in Fig. 4, for the purpose of avoiding its loss. At its other end, the rod 5 is provided with a cylindrical head 9 resting on the corresponding flange of the branch 4.

Around the head 9 is secured the lower member 11 of a sleeve 10 forming part of the mounting of the hammer 1, said lower member receiving the lower half of the hammer body, while the upper part of the latter fits without any play into a half-collar 12 pivoted to the part 11 by means of a hinge 13. At the side opposite to the latter, each of the parts 11 and 12 terminates in a kind of oval loop such as 14, and into the said loops is introduced a cotter or wedge 15 which insures perfect tightening of the hammer in its mounting.

The tube 3 is provided inside, at its free end, with a bore 16 into which can be introduced the rod 5, and in this case, the pin 7ª is introduced into a lateral hole of the tube 3 and into the groove 6 of the said spindle, as shown in Fig. 4. Owing to this arrangement, it is possible to arrange the hammer below the tube 3, as well as above, to facilitate drilling as may be required.

The arm 3 is introduced into one of the parts 17 of a double strap or clip, the other part of which is mounted on a tubular column 19. The part 17 comprises two resilient branches secured to the part 18 and terminating each in a kind of a loop 20. At the bottom of the said part 17 is mounted a lining 21 which fits the shape of the tube 3 which is compressed and held in place by a cotter pin 22 forced into the loops 20.

The part 18 also comprises two resilient branches surrounding the column 19 and pressed together by a cotter pin 23.

It will be readily understood that, owing to the arrangement described, it is possible to move the pneumatic hammer 1 at will away from, or nearer to, the column 19 by sliding the arm 3 in the clip 17; it is also possible to turn the hammer about the column and to bring it either to the right or to the left of the latter; finally it can be raised or lowered at will, by sliding the clip 18 on the column 19. Thus, the drill can be brought to any desired point of the cutting front, which it is desired to attack, and it can be easily moved for executing the cutting.

But it is necessary to keep the clip 18 at the level at which it has to remain. To that end, it is supported by a split sleeve or socket 24 resting on a collar 25, both being mounted on the column 19; this collar or clip 25 is similar to those already described, and it is tightened on the column by means of a cotter pin 26, so as to prevent it from sliding.

The column 19 must not be of fixed length, for it must be capable of being adapted to the various heights or widths of the gallery in which work is done, according as the tube 19 is placed vertically or horizontally. To that end, the said tube 19 is made in two parts of one and the same diameter, but of unequal length (Fig. 1); they are provided with opposite screwthreads and connected together by a nut or screwthreaded sleeve 27 by means of which they can be brought nearer together or farther apart, so as to give the whole the length desired and to press the ends (against the roof and the bottom, or against the walls) so as to insure immobility of the column.

At each of the said ends is secured a claw 28 intended to prevent sliding and resting either against the uprights or the timbering or against wooden parts 29 specially provided for the purpose.

One of the types of drills that can be used on the hammer, is shown in Figs. 5–7; its head 30 which can be square in cross-section, fits into the hammer like an ordinary tool, and in front is a circular shoulder 31 forming a collar and provided on its circumference with a groove 32 into which opens a radial hole 33 terminating at the other end at a longitudinal hole 34 extending throughout the whole length of the drill, but plugged up at the head side by a pin 35 forced in. On the collar 31 is mounted a split collar or clip 36, the ends of which terminate in loops 37 for the engagement of a tightening wedge or cotter pin, as in the cases described in the foregoing. Into a boss of the said collar 36 is screwed a union 39, the inner tapering end of which must be introduced into the hole 33 of the collar and insure a tight joint at this point. This union 39 is intended to receive a flexible hose supplying water under pressure, the supply of which can be regulated at will, and which, escaping through the end of the drill, washes away the debris and the dust produced by the work.

As regards the body of the drill, it is preferably flattened as already stated, and its cross-section has an oval or elliptical shape, like that of the hole 34, throughout the whole length of the same body.

The end of the tool which does the work, can be slightly widened and provided with teeth as shown in the drawing; but like the body, it could be given any other shape, according to the nature of the coal or the ore, and the requirements of working.

In Fig. 8 is shown a modified construction in which the clips $17^a$, $18^a$ are formed with frusto-conical portions 40, 41, respectively, which engage around a double cone 42. This construction enables the arm 3 to be arranged obliquely as may be required to avoid moving the clips 18 and 25 on the column 19, and to enable a higher or lower point of the cutting front to be reached. When the arm 3 has been arranged in the desired position the cotter pin 22 is caused to tighten the device.

It will also be seen that the tightening or compression of the parts described, is effected by means of cotter pins and does not require any spanners which are liable to get lost; the only existing nut 27 having a diametrical hole 30 which enables it to be turned by means of any pin etc.

The coal-cutting machine could be converted on the spot into a drilling machine, into a pick ax, stone dresser, short, light, very powerful, quick and without any reactions, as the weight of the apparatus is very small; its erecting is very quick. The furrow traced in the layer being very narrow, the volume of dust produced by cutting is reduced accordingly; the consumption of compressed air is also reduced, as well as the cost of labor, although the output can be greatly increased.

I claim:

The combination of a supporting column, an arm having a transverse opening and also having a bore extending through one end, means adjustable on the column to secure said arm to said column at an angle thereto, and means to secure a pneumatic hammer to said arm and having an arm for insertion either in the said opening or the said bore thereof.

In testimony whereof I affix my signature.

ALBÉRIC LOUIS CHOPIN.